United States Patent

Keresman, III et al.

(10) Patent No.: US 10,163,086 B2
(45) Date of Patent: Dec. 25, 2018

(54) UNIVERSAL PAYMENTS DASHBOARD

(75) Inventors: Michael A. Keresman, III, Kirtland Hills, OH (US); Francis Sherwin, Cleveland, OH (US); Chandra Balasubramanian, Cleveland, OH (US)

(73) Assignee: CardinalCommerce Corporation, Mentor, OH (US)

( * ) Notice: Subject to any disclaimer, the term of this patent is extended or adjusted under 35 U.S.C. 154(b) by 602 days.

(21) Appl. No.: 12/430,563

(22) Filed: Apr. 27, 2009

(65) Prior Publication Data

US 2009/0299878 A1  Dec. 3, 2009

Related U.S. Application Data

(60) Provisional application No. 61/047,942, filed on Apr. 25, 2008.

(51) Int. Cl.

| *G06Q 30/00* | (2012.01) |
| *G06Q 20/12* | (2012.01) |
| *G06Q 20/22* | (2012.01) |
| *G06Q 30/06* | (2012.01) |
| *G07F 19/00* | (2006.01) |

(52) U.S. Cl.
CPC .......... *G06Q 20/12* (2013.01); *G06Q 20/227* (2013.01); *G06Q 30/06* (2013.01); *G06Q 30/0601* (2013.01); *G07F 19/206* (2013.01)

(58) Field of Classification Search
USPC .................................................. 705/26, 14
See application file for complete search history.

(56) References Cited

U.S. PATENT DOCUMENTS

| 2003/0158791 A1 | 8/2003 | Gilberto et al. |
| 2006/0282382 A1 | 12/2006 | Balasubramanian et al. |
| 2007/0100770 A1 | 5/2007 | Grinberg et al. |
| 2007/0245310 A1* | 10/2007 | Rosenstein ....... H04L 29/08072 717/116 |
| 2008/0033834 A1 | 2/2008 | Tarvydas et al. |

(Continued)

FOREIGN PATENT DOCUMENTS

WO  WO 2005/017704  2/2005

OTHER PUBLICATIONS

European Search Report dated Oct. 14, 2011.

*Primary Examiner* — Russell S Glass
(74) *Attorney, Agent, or Firm* — The Webb Law Firm

(57) ABSTRACT

A universal payments dashboard system provides eCommerce merchants with an easy to integrate web page (inline frame) that displays all alternative payment button options that consumers can use on the merchant website(s) to pay for the purchase. Such merchants can display the dashboard on their shopping cart page(s) and on their checkout page(s) at the point where users select the payment option. The dashboard communicates with a payment dashboard provider to complete the payment for the transaction, including any consumer interaction such as entering checking account information, personal details, etc. Upon completing the payment for the order, the dashboard provides the merchant with the completed order information (e.g., a prepaid order) along with all the payment information. The dashboard supports all alternative payment options, payment transaction notifications to enable single cash register functionality and work in conjunction with alternative payment initiatives.

29 Claims, 3 Drawing Sheets

(56) References Cited

U.S. PATENT DOCUMENTS

| | | | |
|---|---|---|---|
| 2008/0091528 A1* | 4/2008 | Rampell | G06Q 30/0207 |
| | | | 705/14.1 |
| 2009/0164315 A1* | 6/2009 | Rothman | G06Q 30/02 |
| | | | 705/14.52 |
| 2009/0271275 A1* | 10/2009 | Regmi | G06Q 20/209 |
| | | | 705/14.73 |

* cited by examiner

UNIVERSAL PAYMENTS DASHBOARD

This application claims priority from U.S. Provisional Application Ser. No. 61/047,942 filed on Apr. 25, 2008.

BACKGROUND

The present inventive subject matter relates to the art of payment processing for commercial transactions. It finds particular application in conjunction with payments and/or commercial transactions conducted over a public data network such as the Internet, and it will be described with particular reference thereto. However, one of ordinary skill in the art will appreciate that it is also amenable to other like applications.

By way of background, merchants and customers alike enjoy the benefit of conducting business over telecommunication networks such as the Internet. Generally, it is advantageous for both parties to have available multiple options from which the customer is able to select a desired form of payment for a given transaction. Examples of such commercially available payment options for conducting eCommerce transactions include traditional and alternate payment brands alike. Notwithstanding the benefit, merchants may find it unduly burdensome to integrate and/or otherwise support a wide variety of payment options on their websites.

In many conventional approaches, for a merchant to offer and/or otherwise support a particular payment option or method, they have to implement a specific protocol or follow specific guidelines that are commonly prescribed or otherwise defined by the payment brand provider. These protocols and/or guidelines for completing eCommerce transactions typically vary by payment brand. Complying with multiple different protocols and/or guidelines can be unwieldy for a merchant that would prefer to concentration efforts on sales or other important business of the merchant. The problem can be further exacerbated, for example, when new payment options and/or methods are periodically developed for conducting eCommerce transaction. Additionally, existing payment options and/or method may periodically change so that the merchant website has to be updated or altered to properly support the changed payment option. Those of ordinary skill in the art will appreciated, to continue supporting a wide variety of payment options as they are developed and/or periodically changed, can involve significant work and/or dedication of resources on the part of a merchant to bring their website into suitable compliance for providing the desired payment brands to customers.

Therefore, a new and improved system and apparatus for providing a merchant's website with one or more payment options to be selected by a customer is disclosed that overcomes the above-referenced problems and others.

BRIEF DESCRIPTION

In accordance with an aspect of the exemplary embodiments, a universal payments dashboard system for online transactions is provided. The system includes a universal payments dashboard server that is operative to: provide a universal payments dashboard on a checkout page or application for an online merchant, wherein the dashboard is included on the checkout page or application via a windowing technique that points to the dashboard server; fill or populate the dashboard to present one or more selected payment options to an online customer; and customize content on the dashboard for the merchant.

In accordance with other aspects of the exemplary embodiments, the universal payments dashboard system may also include a merchant profile database storing a merchant profile for each of a plurality of different merchants and/or a customer profile database storing a customer profile for each of a plurality of different customers.

In accordance with yet another aspect of the exemplary embodiments, an apparatus for providing universal payments dashboards for online transactions is provided. The apparatus includes means for providing a universal payments dashboard on a checkout page or application for an online merchant, wherein the dashboard is included on the checkout page or application via a pointer that points to the dashboard server. The system also includes means for filling or populating the dashboard to present one or more selected payment options to an online customer, means for customizing content on the dashboard for the merchant, means for storing a merchant profile for each of a plurality of different merchants, and means for storing a customer profile for each of a plurality of different customers.

BRIEF DESCRIPTION OF THE DRAWINGS

The present inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

Figure 1:
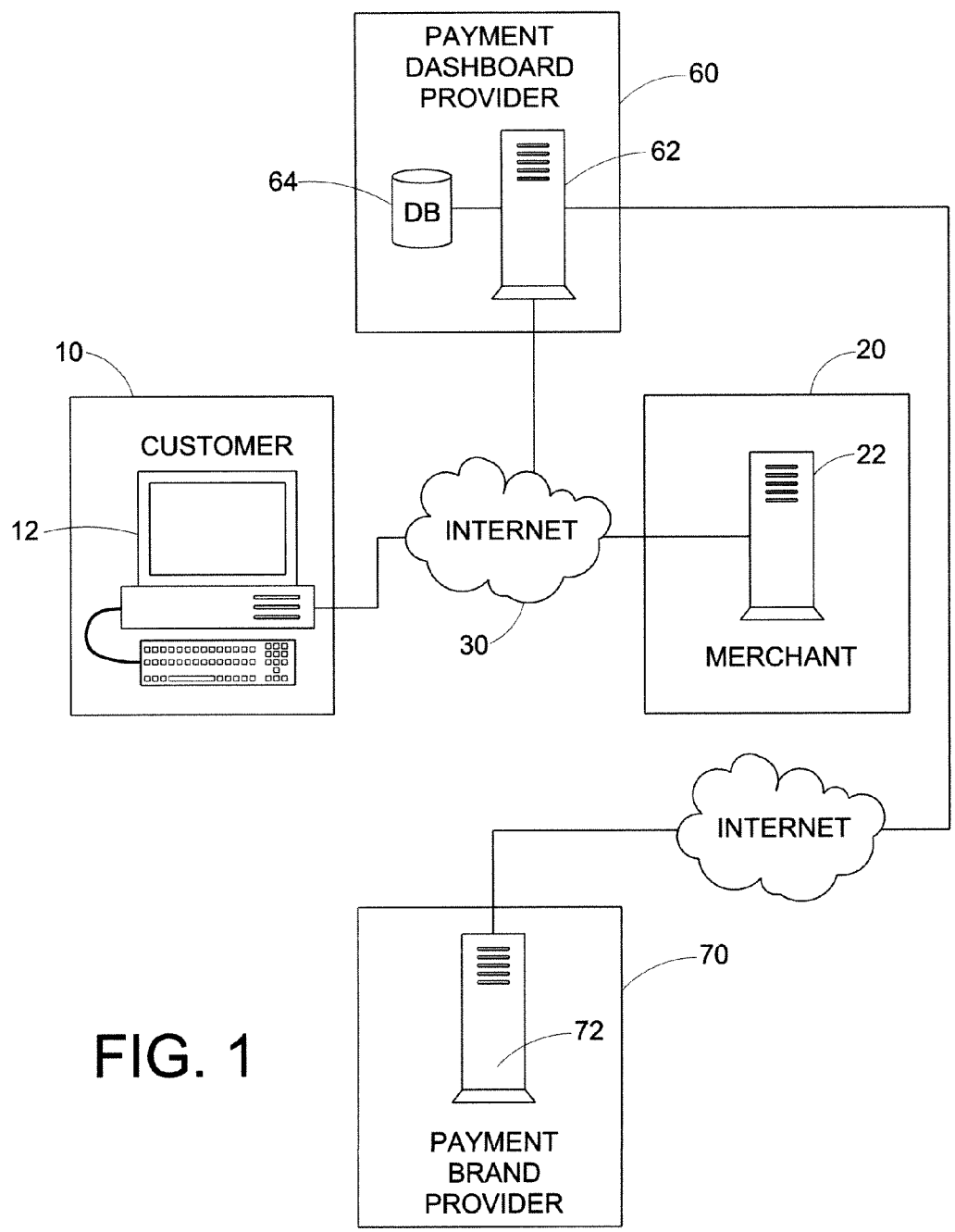
FIG. 1 is a diagrammatic illustration showing an exemplary arrangement of various parties with respect to a telecommunications network suitable for practicing aspects of the present inventive subject matter.

With reference to FIG. 1, there is shown a customer 10 that visits a website of a merchant 20. Suitably, the customer 10 employs a computer 12 or other suitable end user device on which a web browser or the like is running to access the website over a telecommunications network 30. For example, the network 30 is optionally a public data network such as the Internet or another suitable data network on which the website is provided by the merchant 20 or another like proxy. Suitably, the computer 12 or end user device employed by the user 10 is operatively connected to the network 30 in the usual manner. Additionally, the website is suitably provided and/or supported via an appropriate web server 22 or other like server that is also operatively connected to the network 30 in the usual manner.

Also shown in FIG. 1 is a universal payment dashboard provider 60 that operates and/or maintains a "dashboard" server 62. Suitably, the server 62 is a web server or other like server that is operatively connected to the network 30 in the usual manner. Additionally, a payment brand provider 70 also optionally employs a server 72 that is operatively connected to the network 30 to communicate and/or exchange data with respective parties.

While only a single customer 10 and a single merchant 20 are illustrated in FIG. 1 for the purposes of simplicity and/or clarity herein, it is to be appreciated that in practice, multiple customers and/or merchants are suitably situated likewise and served in similar manners by the payment dashboard provider 60 and/or the dashboard server 62. Additionally, while only a single payment brand provider 70 is illustrated in FIG. 1 for the purposes of simplicity and/or clarity herein, it is to be appreciated that in practice, multiple such payment brand providers 70 are generally similarly situated.

Figure 2:
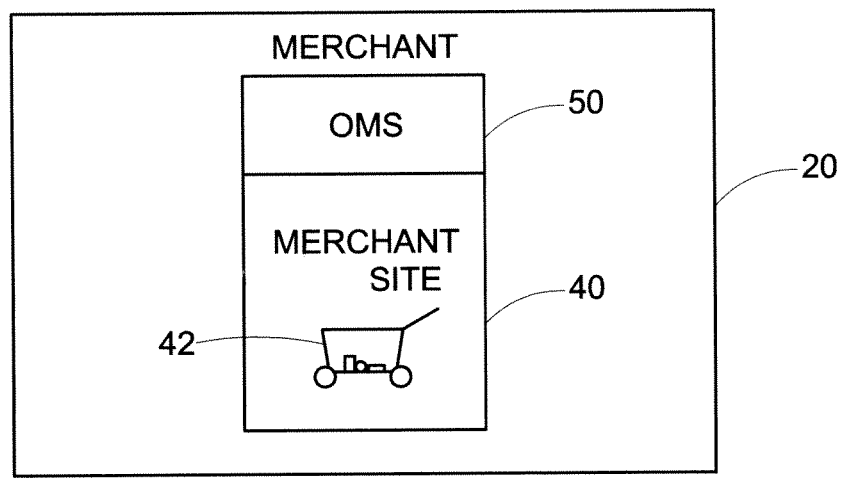
FIG. 2 is a diagrammatic illustration showing an exemplary configuration of merchant resources which is suitable for practicing aspects of the present inventive subject matter.

With reference to FIG. 2, suitably, the website (illustrated functionally by element 40) provided by the merchant 20 includes and/or otherwise supports a virtual shopping cart 42 of the type typically employed on merchant websites or another like application or device which the customer 10 can use to select and/or deposit one or more items for purchase from the website 40. That is to say, in practice, the customer 10 shops on the website 40 by browsing to one or more various webpages included in and/or otherwise supported on the website 40 and employing the shopping cart 42 in the usual manner to select one or more desired items offered for sale on the website 40. Additionally, the merchant 20 also optionally employs a conventional order management system (OMS) 50 that is operatively linked to the website 40 in order to fulfill and/or otherwise process orders associated with completed purchases made on the website 40.

Figure 3:
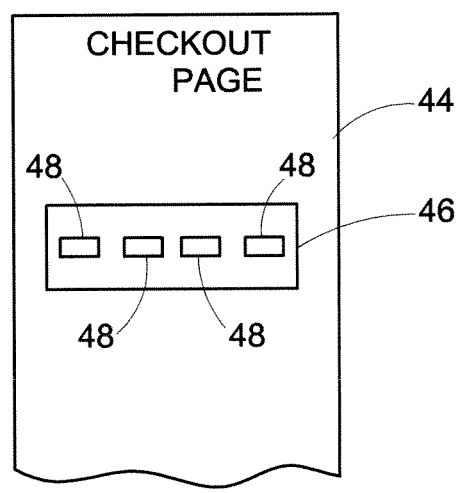
FIG. 3 is a diagrammatic illustration showing an exemplary checkout webpage including a dashboard which embodies aspects of the present inventive subject matter.

With reference to FIG. 3, in practice, when the customer 10 is ready to complete their purchase, they employ the browser running on their computer 12 to navigate to a checkout or other like webpage 44 that is provided by and/or otherwise served from the server 22. In the illustrated embodiment, a dashboard 46 is provided on the checkout webpage 44. Optionally, the dashboard 46 may also be suitably included on a shopping cart page. Suitably, the webpage 44 is defined using HyperText Mark-up Language (HTML) or other suitable language, and the dashboard 46 is optionally included on the webpage 44 via an inline frame or iframe which points to the server 62 (as shown in FIG. 1) that fills or populates the frame or dashboard 46 to present and/or otherwise provide one or more selected payment options to the customer 10.

Returning attention now again to FIG. 1, the server 62 is suitably a web server or the like that is operated and/or otherwise maintained by a third party or other payment dashboard provider 60 and is operatively connected to the network 30 in the usual manner. In operation, the server 62 supplies and/or otherwise serves the content for the dashboard 46 to the browser running on the customer's computer 12 when the webpage 44 is served thereto from the server 22. Suitably, the content for the dashboard 46 includes one or more payment options presented as icons or links 48 that the customer 10 can selectively choose in accordance with the desired payment brand they wish to employ to complete the transaction. In practice, the one or more particular payment options (and accordingly the one or more particular icons or links 48) to be present in the dashboard 46 are selected from a plurality of different payment options supported by a plurality of different payment brand providers, such as the payment brand provider 70.

Suitably, the dashboard content is customized for a particular merchant and/or customer. For example, a merchant profile database (DB) 64 optionally includes merchant profiles for a plurality of merchants served by the coordinator 60 (including, for example, the merchant 20). Accordingly, when the dashboard 46 is invoked from the website 40 of the merchant 20, the server 62 accesses the profile for the merchant 20 from the DB 64. In turn, based on the obtained profile, the server 62 determines the particular content to be provided in the dashboard 46. Suitably, for example, the profile may dictate which payment options are to be presented in the dashboard 46. For example, in one instance the merchant profile may result in the dashboard 46 providing options for payment brands X, Y and Z, while in another case, a different merchant profile may result in the dashboard providing options for payment brands A, B and C. Additionally, the profile may also dictate the order in which payment options are present, i.e., the sequence in which the icons or links 48 appear in the dashboard 46. Moreover, the appearance (i.e., size, shape, color, etc.) of the different icons or links 48 as well background graphics, text, etc. can also be customized by the server 62 based upon the profile obtained from the DB 64. This, for example, may be used to encourage the selection of one payment brand over another as may be beneficial to the merchant 20, the customer 10, the coordinator 60 or for whatever reason.

In addition to customizing the dashboard content based upon the particular merchant, other factors may be considered by the server 62. For example, before the dashboard 46 content is generated (i.e., supplied with particular icons or links 48 for different payment brands and/or supplied other background content), the server 62 is optionally provided with an identity of the customer 10 and/or the identity and/or nature of the items being purchased. In particular, data on the items being purchased may be obtained by the server 62 from the shopping cart 42. Similarly, where the merchant 20 is aware of the customers identity or some identifying information, the merchant's server 22 may supply customer identity data to the server 62. Alternately, the server 62 may optionally request customer identity information from the customer 10 before completing generation of the content for the dashboard 46. Suitably, multiple customer profiles are maintained in a database (e.g., the DB 64 or alternately a separate database) for different customers. The customer profiles may track, for example, customer's shopping habits and/or preferences along with payment selection habits and/or preferences. Additionally, the customer's location (i.e., geographic location, residence, street address, etc.) may also be maintained in the customer profile. In fact, any factor that may affect the payment option selection process performed by the customer may optionally be tracked and/or otherwise maintained in the customer profile.

Accordingly, based on the customer profile and/or purchase data, the server 62 may select or adjust the dashboard content, i.e., which particular payment options or icons/links 48 to include and/or not include on the dashboard 46, the order or sequence of the included payment options or icons/links 48, the appearance of the icons/links 48, the appearance and/or content of the background, etc. For example, if from the customer data it is known that the customer 10 does not have an account for payment brand X, then the icon or link 48 corresponding to payment brand X will not be supplied to the dashboard 46. Alternately, if the customer data or merchant data shows that either or both are located in a particular country, the option to select payment brands specific to that country may be included in the dashboard 46, while other payments brands not accepted in that country may be excluded. In another example, if it is known from the customer data and/or the shopping cart data, that customer 10 prefers to use payment brand Y for the particular items in the shopping cart 42, then the icon or link 48 corresponding to the payment brand Y may be listed or displayed first in the dashboard 46. Of course, other suitable results based on a variety of different particular factors may likewise be envisioned.

Once the dashboard 46 has been filled with the particular content, the customer 10 chooses the desired payment option for completing the transaction by selecting one of the icons/links 48 corresponding to the payment brand of their choice. Accordingly, the selection of the particular icon/link 48 invokes a particular payment processing operation specific to the corresponding payment brand. For example, the server 62 optionally launches a particular script or other application or program in response to the selected icon/link 48 to complete processing of the payment in accordance with the protocols and/or guidelines defined for the particular payment brand. Suitably, the customer 10 is prompted by the dashboard server 62 to provide any additional payment data (e.g., such as an account number or ID, authentication credentials, etc.) that will be used to complete payment for the transaction. Upon entry of the requested payment data by the customer 10, the payment data along with any other relevant transaction data (i.e., purchase price or amount, merchant data, transaction ID, etc.) is then forwarded from the server 62 to a transaction processor. In practice, the transaction processing is optionally carried out by the payment brand provider 70 and/or an intermediary or suitable proxy.

After the transaction has been submitted for processing, the transaction result (i.e., approved or denied or otherwise) is returned to the server 62. Optionally, the server 62 then informs the customer 10 of the result, and provided the transaction has been approved, redirects the customer 10 to the transaction processor so that the customer 10 can provide the transaction processor acknowledgement of the payment. Having received the acknowledgement for the payment, the transaction processor generates and/or returns a payment notification (e.g., to the server 62 or other suitable proxy) that can in turn be delivered to the merchant's OMS 50 as a completed order notification. Suitably, the order notification is sent to the merchant 20 in any one or more of a variety of different ways including: e-mail, XML (extensible Markup Language), WebServices, Amazon Order Notification Service Format, HTTP (Hyper-Text Transfer Protocol) Post, etc.

As can be appreciated from the foregoing description, the dashboard 46 allows the merchant 20 to offer a customized selection of payment options to the customer 10 without having to significantly modify their website 40. In practice, the merchant 20 can incorporate the dashboard 46 in to their website 40 by merely including the inline frame or iframe or other suitable script (e.g., JavaScript) on the appropriate checkout webpage 44 or shopping cart page. Moreover, the completed order notification sent to the OMS 50 of the merchant 20 allows the merchant 20 to accept such orders just like they would other prepaid orders. In this manner, the merchant 20 can accept alternative payment brands without any modification to their OMS 50 or shopping cart software 42.

Figure 4:
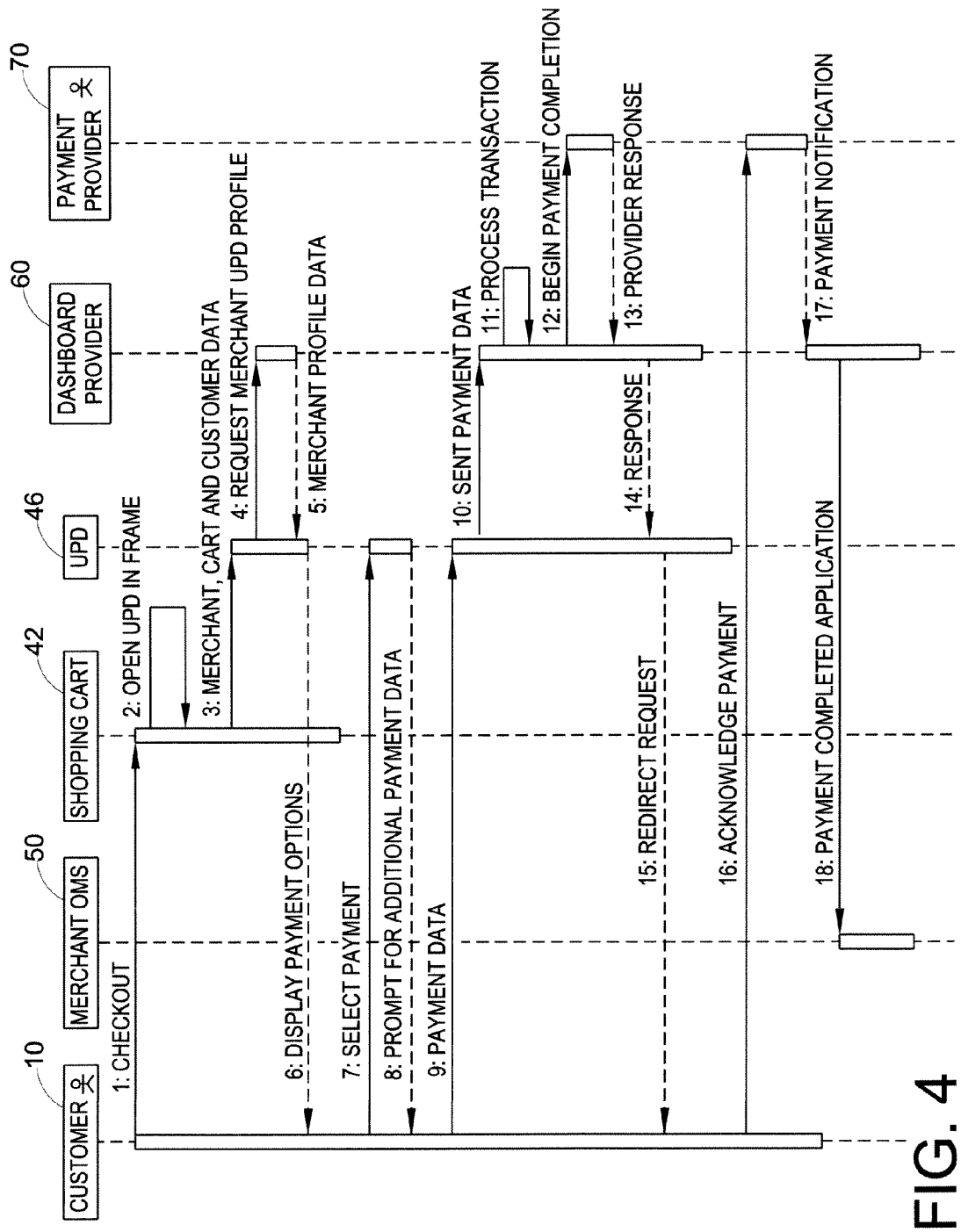
FIG. 4 is a flow diagram illustrating an exemplary embodiment of the present inventive subject matter.

FIG. 4 is a flow diagram illustrating an example of an online transaction that utilizes the universal payments dashboard described above.

While the foregoing description refers to a website 40 and the Internet 30 and a web browser running on the customer's computer 12, optionally, the present inventive subject matter is also applicable to mobile commerce transactions. For example, the customer 10 may optionally employ as a client device a mobile telephone or other like mobile and/or wireless device suitably equipped to access an appropriate shopping site supported by the merchant 20 via a suitable server or other appropriate equipment for providing mobile webpages and/or other suitable mobile content to the customer's device.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. The invention should be construed as including all such modifications and alterations that come within the scope of the appended claims or the equivalents thereof.

The invention claimed is:

1. A universal payments dashboard system for online transactions, the system comprising:
   a universal payments dashboard server in communication with a merchant server associated with an online merchant, wherein the merchant server is separate from the universal payments dashboard server and hosts a checkout page or application used by an online customer of the online merchant, the universal payments dashboard server operative to:
      provide a universal payments dashboard on the checkout page or application of the online merchant, the, the universal payments dashboard embedded in the checkout page or application using a windowing technique that points to the universal payments dashboard server with at least one of a script and an inline frame, the universal payments dashboard configured to receive payment information from the online customer for an online transaction between the online customer and the online merchant; fill or populate the universal payments dashboard to present one or more selected payment options to the online customer while the online customer is on the checkout page or application of the online merchant;
      customize content of the universal payments dashboard based on a merchant profile associated with the online merchant.

2. The system of claim 1, wherein the content of the universal payments dashboard includes the one or more selected payment options presented as icons or links, the icons or links selectable by the online customer.

3. The system of claim 1, further comprising:
a merchant profile database storing a merchant profile for each of a plurality of different merchants including the merchant profile for the online merchant;
wherein the universal payments dashboard server is further operative to, in response to invocation of the universal payments dashboard from the checkout page or application of the online merchant:
obtain the merchant profile of the online merchant from the merchant profile database.

4. The system of claim 3, wherein the obtained merchant profile specifies one or more of an order in which the one or more selected payment options are presented to the online customer, an appearance of different icons or links representing the one or more selected payment options, at least one of the one or more selected payment options, and background graphics and text in the universal payments dashboard.

5. The system of claim 1, further comprising:
a customer profile database storing a customer profile for each of a plurality of different customers, including the online customer;
wherein the universal payments dashboard server is further operative to:
obtain a customer profile of the online customer from the customer profile database; and
customize the content of the universal payments dashboard based on the obtained customer profile.

6. The system of claim 1, wherein the customer profiles track one or more of the following aspects for each customer: shopping habits, payment selection habits, and geographic location.

7. An apparatus for providing universal payments dashboards for online transactions, the apparatus comprising:
a dashboard server in communication with a merchant server associated with an online merchant, wherein the merchant server is separate from the dashboard server and hosts a checkout page or application used by an online customer of the online merchant, the dashboard server operative to:
provide a universal payments dashboard on the checkout page or application of the online merchant, the universal payments dashboard incorporated in to the checkout page or application by reference using a windowing technique that points to the universal payments dashboard server with at least one of a script and an inline frame, the universal payments dashboard configured to receive payment information from the online customer for an online transaction between the online customer and the online merchant;
store a merchant profile for each of a plurality of different merchants, including the online merchant;
store a customer profile for each of a plurality of different customers, including the online customer;
select one or more of one or more payment options supported by the dashboard server based on the merchant profile of the online merchant and/or the customer profile of the on line customer;
fill or populate the universal payments dashboard to present the selected payment options to the online customer; and
customize content on the universal payments dashboard for the merchant based on at least one of the merchant profile and the customer profile.

8. The apparatus of claim 7, wherein the content of the universal payments dashboard includes the one or more selected payment options presented as icons or links, the icons or links selectable by the online customer.

9. The apparatus of claim 7, wherein the dashboard server is further operative to, in response to invocation of the universal payments dashboard from the checkout page or application of the online merchant:
obtain the merchant profile of the online merchant from the stored merchant profiles; and
customize the content of the universal payments dashboard based on the obtained merchant profile.

10. The apparatus of claim 9, wherein the obtained merchant profile specifies one or more of an order in which the one or more selected payment options are presented to the online customer, an appearance of different icons or links representing the one or more selected payment options, at least one of the one or more selected payment options, and background graphics and text in the dashboard.

11. The apparatus of claim 7, wherein the dashboard server is further operative to:
obtain a customer profile of the online customer from the stored customer profiles; and
customize the content of the universal payments dashboard based on the obtained customer profile.

12. The apparatus of claim 11, wherein the customer profiles track one or more of the following aspects for each customer: shopping habits, payment selection habits, and geographic location.

13. The system of claim 1, wherein the universal payments dashboard is embedded in the checkout page or application using one of an iframe, an inline frame, and JavaScript.

14. The system of claim 3, wherein the dashboard server is further operative to select the payment options from one or more payment options supported by the dashboard server based on the obtained merchant profile.

15. The system of claim 5, wherein the dashboard server is further operative to select the payment options from one or more payment options supported by the dashboard server based on the obtained customer profile.

16. The system of claim 1, wherein the one or more selected payment options consist of credit cards and/or debit cards.

17. The system of claim 1, wherein the dashboard server is further operative to:
receive the nature of one or more items being purchased by the online customer from the online merchant; and
customize the content of the universal payments dashboard based on the identity of the one or more items being purchased by the online customer.

18. The system of claim 1, wherein the dashboard server is further operative to:
customize the content of the universal payments dashboard based on a plurality of:
dashboard preferences of the online merchant;
one or more of shopping and/or payment habits, shopping and/or payment preferences, and geographic location of the online customer; and
the nature of one or more items being purchased by the online customer from the online merchant.

19. The apparatus of claim 7, wherein the one or more selected payment options consist of credit cards and/or debit cards.

20. The system of claim 1, wherein the universal payments dashboard is embedded in the checkout page or application using an iframe.

21. The system of claim 1, wherein the universal payments dashboard is embedded in the checkout page or application using an inline frame.

22. The apparatus of claim 7, wherein the universal payments dashboard is embedded in the checkout page or application using JavaScript.

23. The system of claim 1, wherein the dashboard server is further operative to:
in response to the online customer not having an account for a particular payment brand, not presenting an option for the particular payment brand.

24. The system of claim 1, wherein the dashboard server is further operative to:
if the customer data or merchant data shows that either the online customer or the online merchant is located in a particular country:
include, in the universal payments dashboard, an option to select payment brands specific to the particular country.

25. The system of claim 1, wherein the dashboard server is further operative to:
if it is known from customer data that the online customer prefers to use a particular payment brand for particular items in a shopping cart, display an icon corresponding to the particular payment brand first in the universal payments dashboard.

26. The apparatus of claim 11, wherein the customer profiles track the following aspects for each customer: shopping habits, payment selection habits, and geographic location.

27. A computer-implemented method for providing a universal payments dashboard for online transactions, comprising:
providing, with a first server in communication with a separate merchant server associated with an online merchant, a universal payments dashboard embedded in checkout page or application of the online merchant, the checkout page or application of the online merchant hosted by the separate merchant server and used by an online customer of the online merchant, the universal payments dashboard embedded in the checkout page or application using a windowing technique that points to the universal payments dashboard server with at least one of a script and an inline frame, the universal payments dashboard configured to receive payment information from the online customer for an online transaction between the online customer and the online merchant;
filling or populating the universal payments dashboard to present one or more selected payment options to the online customer while the online customer is on the checkout page or application of the online merchant; and
customizing content of the universal payments dashboard based on a merchant profile associated with the online merchant.

28. The computer-implemented method of claim 27, wherein the content of the universal payments dashboard includes the one or more selected payment options presented as icons or links, the icons or links selectable by the online customer.

29. The computer-implemented method of claim 27, wherein the merchant profile specifies one or more of the order in which the one or more selected payment options are presented to the online customer, the appearance of different icons or links representing the one or more selected payment options, at least one of the one or more selected payment options, and background graphics or text in the universal payments dashboard.

* * * * *